United States Patent [19]

Dettelbach et al.

[11] E Patent Number: Re. 32,986

[45] Reissued Date of Patent: Jul. 18, 1989

[54] DEVICE FOR SCORING WORKPIECES

[75] Inventors: Alfred Dettelbach; Werner Binder, both of Stuttgart, Fed. Rep. of Germany

[73] Assignee: Reich Spezialmaschinen GmbH, Fed. Rep. of Germany

[21] Appl. No.: 199,282

[22] Filed: May 26, 1988

Related U.S. Patent Documents

Reissue of:

[64] Patent No.: 4,711,147
Issued: Dec. 8, 1987
Appl. No.: 813,517
Filed: Dec. 26, 1985

[51] Int. Cl.[4] ..... B27B 5/06; B27G 19/10

[52] U.S. Cl. ..... 83/863; 83/582; 83/881; 83/883

[58] Field of Search ..... 83/862, 863, 864, 883, 83/884, 885, 886, 887, 881, 582

[56] References Cited

U.S. PATENT DOCUMENTS

| | | | |
|---|---|---|---|
| 3,924,496 | 12/1975 | Dermarderosian et al. | 83/864 |
| 4,058,150 | 11/1977 | Pennington | 83/862 |
| 4,098,155 | 7/1978 | Insolio | 83/884 |
| 4,176,572 | 12/1979 | Pennington | 83/862 |
| 4,228,711 | 10/1980 | Insolio | 83/881 |
| 4,245,390 | 1/1981 | Bond | 30/164.95 |
| 4,308,777 | 1/1982 | Lawson | 83/477 |
| 4,534,296 | 8/1985 | Stubbs et al. | 104/8 |

FOREIGN PATENT DOCUMENTS

| | | | |
|---|---|---|---|
| 0077517 | 4/1983 | European Pat. Off. . | |
| 7439738 | 4/1975 | Fed. Rep. of Germany . | |
| 2622329 | 12/1977 | Fed. Rep. of Germany . | |
| 2740673 | 3/1978 | Fed. Rep. of Germany | 83/862 |
| 2818421 | 1/1979 | Fed. Rep. of Germany | 83/863 |
| 9477A | 6/1977 | Italy . | |
| 2050939 | 1/1981 | United Kingdom | 83/863 |

*Primary Examiner*—Frank T. Yost
*Assistant Examiner*—Hien H. Phan
*Attorney, Agent, or Firm*—Kramer, Brufsky & Cifelli

[57] ABSTRACT

A device for scoring workpieces, in particular, laminated panels, which are to be split up subsequently by a circular saw along the scored track, comprises a scoring head arranged in the direction of operation forwardly of the circular saw, and two scoring knives held stationarily on the scoring head and penetrating the workpiece surface, with their mutual spacing corresponding to the cutting width of the saw blade.

10 Claims, 4 Drawing Sheets

DEVICE FOR SCORING WORKPIECES

Matter enclosed in heavy brackets [ ] appears in the original patent but forms no part of this reissue specification; matter printed in italics indicates the additions made by reissue.

The invention relates to a device for scoring workpieces, in particular, laminated panels, prior to their being split up along the scored track by a circular saw or the like.

In a known device of this kind (U.S. Pat. No. 4,245,390), there is arranged forwardly of a circular saw blade, a rotatingly mounted circular knife which scores a line on one side of the saw blade. Rotating circular knives together with their mounting require elaborate manufacturing procedures. They are relatively difficult to adjust and, if necessary, the resharpening procedure is extremely troublesome. Also, the circular knife which in the known case is arranged on one side of the saw blade only, does not prevent chipping of the workpiece on the opposite side of the sawing slit.

The object underlying the invention is to so improve a device of the generic kind that it prevents chipping of the workpiece surface on either side of the sawing slit, and, with a very simple design of the actual scoring member, enables quick adjustment and exchange.

The object is attained in accordance with the invention by a scoring head arranged in the direction of operation forwardly of the circular saw, and by two scoring knives which are stationarily held on the scoring head and penetrate the workpiece surface, with their mutual spacing corresponding to the cutting width of the saw blade.

The following description of preferred embodiments serves to explain the invention in further detail in conjunction with the appended drawings, in which.

Figure 1:
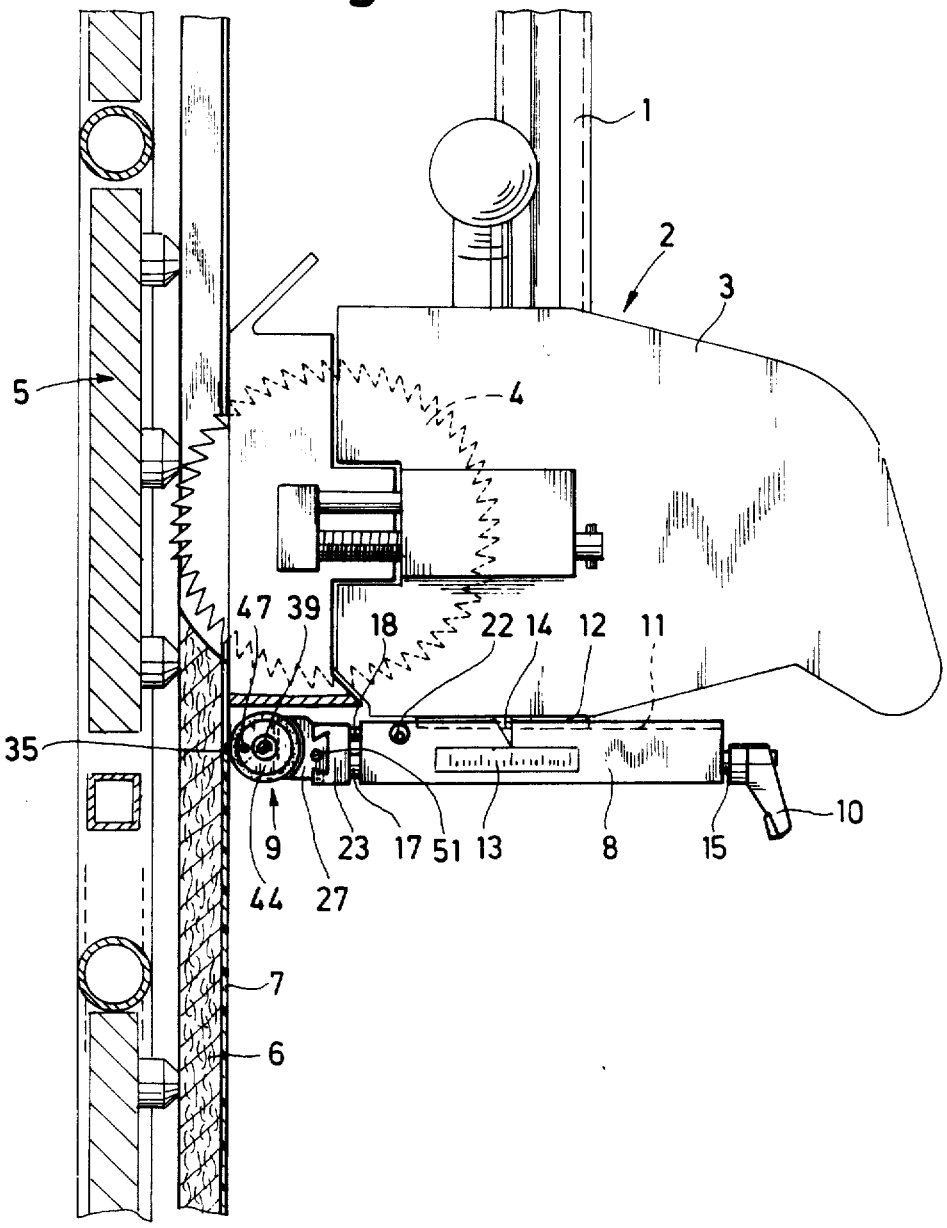
FIG. 1 shows a circular saw with a scoring device connected to and forwardly of the same.

FIG. 1 shows a conventional circular saw 2 substantially vertically displaceable in a slide guiding means 1, with a machine frame 3 and a driven circular saw blade 4 mounted for rotation in the same. A workpiece in the form of a laminated panel 6 supported on a base 5 is split up by the circular saw 2. The layer provided on the surface of the panel 6, which may, for example, consist of plastic, is designated in FIG. 2 by reference numeral 7. The sawing cut is made from the top downwardly in FIG. 1.

Beneath, i.e., in the direction of operation forwardly of the circular saw blade 4, there is attached to the machine frame 3 a holder 8 carrying a scoring head 9. With this scoring head 9, in a manner to be described hereinafter, a track consisting of two sharp cuts is scored to prevent lateral chipping of the workpiece surface in the area of the sawing slit made upon penetration of the following saw blade 4.

Figure 2:
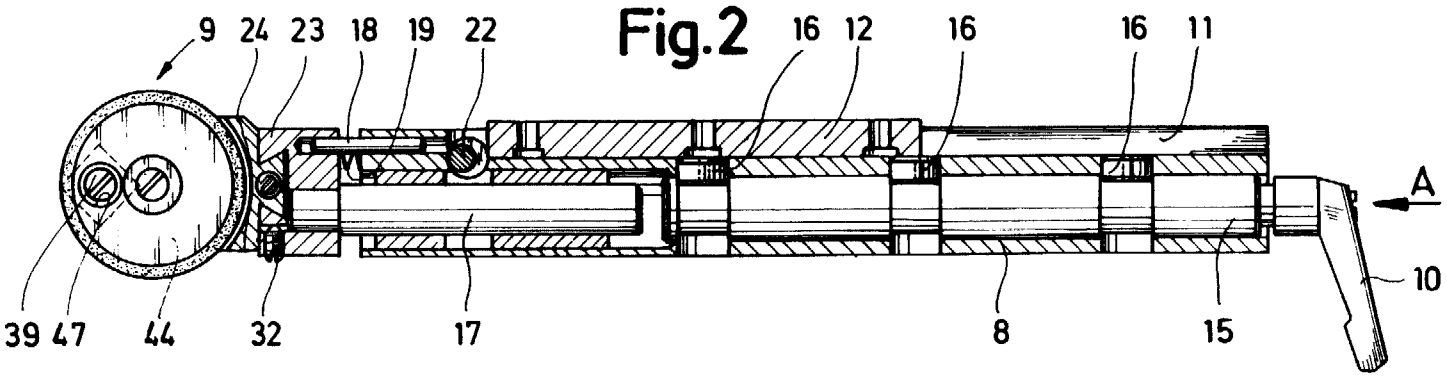
FIG. 2 shows the scoring device is enlarged, partially broken open representation.
Figure 3:
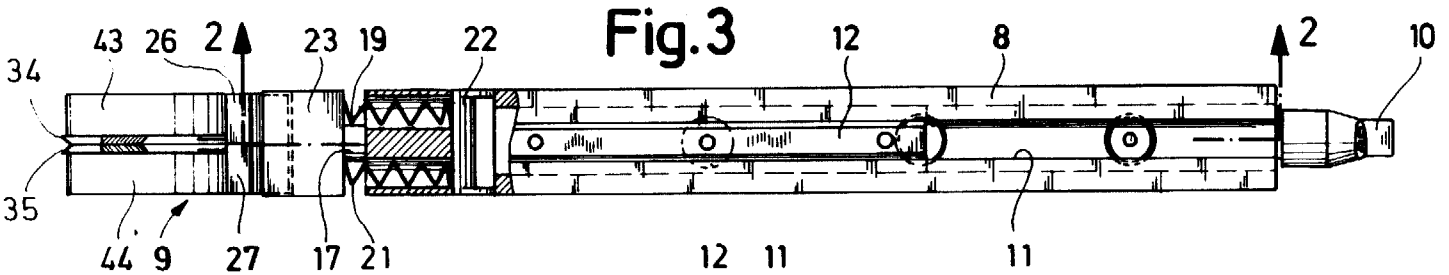
FIG. 3 shows a partially broken open top view of the scoring device of FIG. 2.
Figure 4:
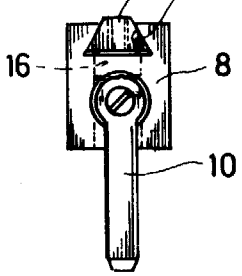
FIG. 4 shows a view of the scoring device in the direction of arrow A in FIG. 2.

As is apparent from FIGS. 2, 3 and 4, the holder 8 comprises on its upper side a dovetail groove 11 in which a dovetail profile 12 rigidly connected to the machine frame 3 of the circular saw 2 engages. In this way, the holder 8 is mounted for substantially horizontal displacement on the underside of the machine frame 3. This horizontal slidability enables setting at a certain workpiece thickness, for example, at the thickness of the panel 6. The holder 8—see FIG. 1-carries a scale 13 which cooperates with a pointer 14 attached to the machine frame 3 to enable the set workpiece thickness to be read off. Mounted in the holder 8 is an eccentric shaft 15 which cooperates with compression members 16 via which the holder 8 is clampable in the desired position on the dovetail profile 12 and thus on the machine frame 3. The eccentric shaft 15 may be rotated for this purpose by a handle 10.

Figure 5:
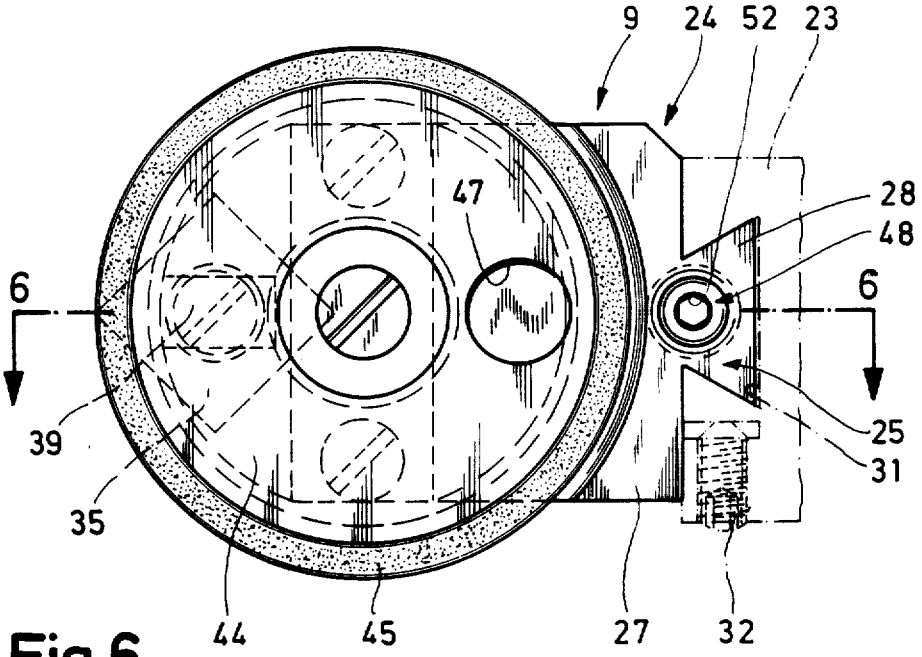
FIG. 5 shows an enlarged isolated view of the scoring device.
Figure 6:
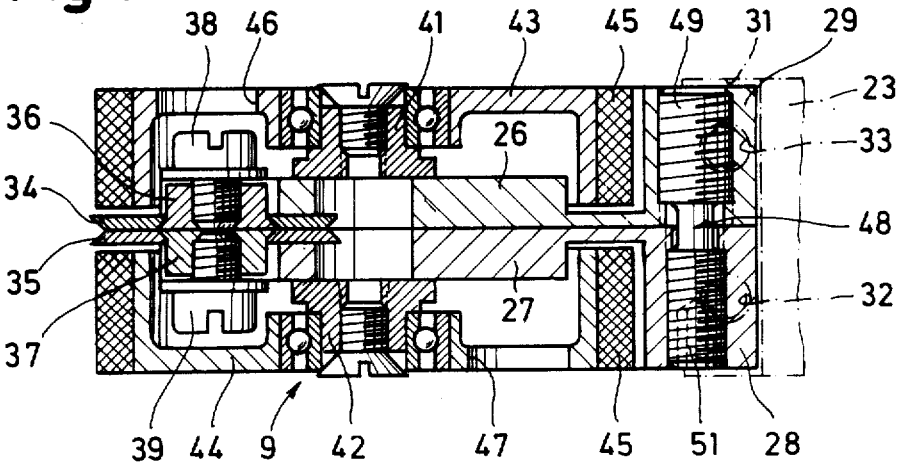
FIG. 6 shows a sectional view taken along line 6—6 in FIG. 5.

The scoring head 9 is connected in a slidably displaceable manner to the holder. To this end, a guide rod 17 protruding from the scoring head 9 engages in a slidably displaceable manner a corresponding bore in the holder 8. A bolt 18, similarly protruding from the scoring head 9 and engaging in a slidably displaceable manner a further bore in the holder 8, prevents relative rotation between the holder 8 and the scoring head 9. Two (schematically illustrated) helical compression springs 19, 21 are arranged in corresponding longitudinal bores in the holder 8 and with their protruding ends impart to the scoring head 9 a pretension with respect to the holder 8 so that the scoring head is pressed with a predetermined force against the workpiece (panel 6). Acting as abutment for the springs 19, 21 is an eccentric shaft 22 rotatably mounted in the holder 8, by rotation of which the pretension of the springs 19, 21 may be set. As is best apparent from FIG. 2, the scoring head 9 comprises two sections, namely a base section 23 from which the rod 17 and the bolt 18 protrude, and a knife carrier section 24 which is connected in a laterally adjustable manner by a dovetail guiding means to the base section 23. The design of the scoring head 9 is illustrated in FIGS. 5 and 6. The knife carrier section 24 held on the base section 23 by the dovetail guiding means 25 consists—see FIG. 6—of two knife carriers 26, 27 each comprising a dovetail-shaped continuation 28 and 29, respectively, with which they are displaceably held in a corresponding dovetail groove 31 on the base section 23. Each knife carrier 26, 27 may be fixed on the base section 23 with a set screw 33 and 32, respectively, allocated to it. The knife carriers 26, 27 may thereby be fixed at a certain mutual spacing on the base section 23.

Each knife carrier 26, 27 carries a scoring knife 34 and 35, respectively, in the form of square-shaped turnover plates known per se. As illustrated, the scoring knives 34, 35 are bevelled at one side and are inserted into the scoring head 9 in such a way that their sloping surfaces face each other. This arrangement is important since only thus is it possible to prevent a warping and chipping of the workpiece surface at the edge of the scoring knives 34, 35 which is not bevelled. When the sloping surfaces penetrate the workpiece surface, the same urge the workpiece material inwardly. The deformations which occur do, however, not have a disturbing effect since the sawing cut is subsequently made in this area. The scoring knives 34, 35 in the form of turnover plates may be connected in four different positions to the knife carriers 26, 27. These very favorably priced parts which are readily available on the market are simply thrown away once they have become blunt.

The scoring knives 34, 35 are joined to the knife carriers 26, 27 by clamping members 36, 37 with obliquely protruding clamping edges which engage corresponding recesses in the scoring knives 34, 35. With the aid of clamping screws 38, 39 which penetrate appropriate slits in the knife carriers 26 and 27, respectively, the clamping members 36, 37 and thus the scoring knives 34, 35 may be pulled towards the respective knife carrier and clamped there.

Protruding from the knife carriers 26, 27 are axle stubs 41 and 42, respectively, on which contact rolls 43 and 44, respectively, are mounted by means of ball bearings. The rolls 43, 44 comprise an elastic covering 45 on their circumferential surfaces. Recesses 46, 47 in the rolls 43 and 44, respectively, enable slackening and tightening of the screws 38 and 39, respectively.

For adjustment of the knife carriers 26, 27 in the dovetail groove 31 and thus for setting of the spacing between the scoring knives 34, 35 there is provided an adjusting screw 48 which penetrates the dovetail profile 25 of the two knife carriers. As is apparent from FIG. 6, the adjusting screw 48 comprises two threaded sections 49 and 51, respectively, with different pitches (and diameters) which engage corresponding threaded bores of the two knife carriers 26 and 27, respectively. A recess 52 is provided in the threaded section 51 for insertion of a tool with the aid of which the adjusting screw 48 may be rotated.

The knife carriers are adjusted in the following manner: Both clamping screws 32, 33 are first tightened so that the two knife carriers 26, 27 are fixed on the scoring head with a certain spacing being maintained between the scoring knives 34, 35. To adjust the knife carrier 26, the clamping screw 33 allocated to it is slackened. By turning the adjusting screw 48 in a certain direction, the two threaded sections 49, 51 exhibiting threads extending in the same direction of rotation rotate in the same direction. Since these threaded sections exhibit different pitches, a displacement of the knife carrier 26 relative to the knife carrier 27 retained by the clamping screw 32 does, however, occur. If in the contrary case, in which the clamping screw 33 is tightened, the clamping screw 32 is slackened and the adjusting screw 48 is again turned, the knife carrier 26 stays in place and the knife carrier 27 is displaced relative to the same on account of the different pitches of the threaded sections 49 and 51. After setting of the desired spacing between the scoring knives 34, 35, both clamping screws 32, 33 must be tightened again before commencing operation with the device.

During operation with the device, the holder 8 is first set with the aid of the scale 13 and the pointer 14 at the thickness of the workpiece to be split up. The saw 2 is then brought into the operating position, whereby the saw blade 4 penetrates the workpiece and the contact rolls 43, 44 rest on the workpiece surface with their elastic covering 45. The springs 19, 21 between the holder 8 and the scoring head 9 press the scoring knives 34, 35 beyond the circumferential surfaces of the contact rolls with the desired depth and force into the surface of the workpiece. Upon displacement of the circular saw 2 and the scoring device connected to the same, two tracks are scored in the workpiece surface by the tips of the scoring knives 34, 35 penetrating the same. The following saw cut is made by the saw blade 4 between these scored tracks which prevent chipping of the workpiece surface at the external sides of the tracks so that a smooth, uniform saw cut is ensured.

The described scoring device is not only suitable for laminated panels, as illustrated in FIG. 1, but also for other workpieces made, for example, of plastic, whose surface might be damaged by chippings or the like in the area of the saw cut during the sawing procedure.

Figure 7:
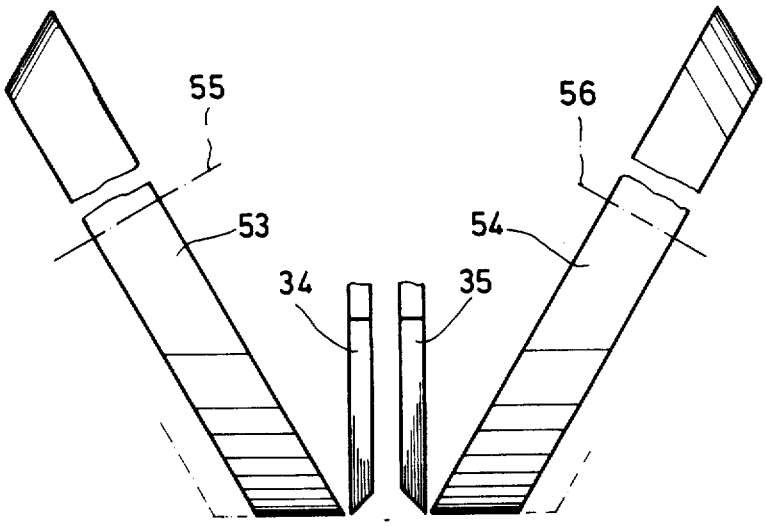
FIG. 7 shows schematically a modified arrangement of contact rolls.

The contact rolls 43, 44 which, by the way, need not necessarily have an elastic circumferential covering 45, furthermore, serve to hold the workpiece surface down at the external sides of the scored track consisting of two cuts, and to prevent deformations, chippings or the like. To this end, it is desirable to bring the circumferential surfaces of the contact rolls 43, 44 as close as possible to the point of penetration of the scoring knives 34, 35. The arrangement according to FIG. 7 enables the circumferential surfaces of the contact rolls to be brought right up to the scoring knives in the area of their point of penetration into the workpiece. The two contact rolls 53, 54 are of frustoconical configuration there and their axes of rotation 55, 56 extend obliquely to the scoring knives 34, 35, i.e., not at right angles to the same, as in the embodiment according to FIG. 6. There is, therefore, adequate space in the upper part of the arrangement according to FIG. 7 to insert the knife carriers (not illustrated) between the contact rolls 53, 54, past the same, into the base section 23 of the scoring device. At the same time, the circumferential surfaces of the contact rolls 53, 54 may, however, be brought as close to the external sides of the scoring knives 34, 35 as desired, so that they press on the workpiece surface immediately beside the scored track.

What is claimed is:

1. An apparatus for scoring laminated workpieces, comprising:

sawing means mounted in a frame relative to the workpiece, for cutting the workpiece along a saw line;

scoring head mounted on a slidable and lockable holder substantially normal to a workpiece surface, said holder affixed to said frame with said scoring head positioned to precede said sawing means along a saw line cut into said workpiece surface;

a pair of opposed, adjustably spaced scoring knives, each individually held by said scoring head against the workpiece under pressure, penetrating said surface thereof, said scoring knives characterized by opposed, beveled interior surfaces and flat exterior surfaces, a pair of knife carriers for transversely adjusting said knife spacing relative to said saw line cut, each of said knife carriers being held by a screw adjustable slide guiding means; and each of said knife carriers being screw clampable on said scoring head means and connected to each other by adjusting screw mechanisms having threaded sections of different pitch engaging said knife carriers.

2. The apparatus of claim 1 wherein said scoring knives comprise turnover plates.

3. The apparatus of claim 1 wherein said scoring knives spacing is selected in dependence of the width of said saw line.

4. The apparatus of claim 1 wherein said pressure is provided by adjustable springs.

5. The apparatus of claim 1 wherein said scoring head further comprises a pair of rolls proximate to said scoring knives for determining the extent of penetration of said knives into said surface.

6. The apparatus of claim 5 wherein said rolls are each laterally disposed along said scoring knives.

7. The apparatus of claim 6 wherein each of said rolls contacts said workpiece surface immediately adjacent to a corresponding one of said scoring knives.

8. The apparatus of claim 6 wherein said rolls each contacts said workpiece surface.

9. The apparatus of claim 6 wherein said rolls each comprises an elastic covering contacting said workpiece surface.

10. The apparatus of claim 5 wherein said rolls are mounted on a pair of knife carriers for transversely adjusting said knife spacing relative to said saw line cut.

* * * * *

UNITED STATES PATENT AND TRADEMARK OFFICE

CERTIFICATE OF CORRECTION

PATENT NO. : Re. 32,986

DATED : July 18, 1989

INVENTOR(S) : Alfred Dettelbach; Werner Binder

It is certified that error appears in the above-identified patent and that said Letters Patent is hereby corrected as shown below:

On the title page, below the filing date of May 26, 1988, please insert the following Foreign Application Priority Data:

January 19, 1985; Federal Republic of Germany; P 35 01 657.4

Signed and Sealed this

Seventeenth Day of July, 1990

*Attest:*

HARRY F. MANBECK, JR.

*Attesting Officer*

*Commissioner of Patents and Trademarks*